(12) United States Patent
Klawinski (10) Patent No.: US 8,650,222 B2
(45) Date of Patent: Feb. 11, 2014

(54) METHOD AND PROGRAM PRODUCT FOR GIS ENABLED LAND MANAGEMENT SYSTEM

(76) Inventor: Brian Klawinski, Houston, TX (US)

( * ) Notice: Subject to any disclaimer, the term of this patent is extended or adjusted under 35 U.S.C. 154(b) by 672 days.

(21) Appl. No.: 12/584,923

(22) Filed: Sep. 14, 2009

(65) Prior Publication Data

US 2011/0066675 A1 Mar. 17, 2011

(51) Int. Cl.
*G06F 17/30* (2006.01)

(52) U.S. Cl.
CPC .............................. *G06F 17/30017* (2013.01)
USPC ........................................................ 707/802

(58) Field of Classification Search
USPC ........................ 707/791, 795, 796, 802, 812
See application file for complete search history.

(56) References Cited

U.S. PATENT DOCUMENTS

| 6,842,754 B2* | 1/2005 | Muntz ................................... 1/1 |
| 2002/0152214 A1* | 10/2002 | Muntz ............................. 707/10 |
| 2003/0140057 A1* | 7/2003 | Thomas et al. ............... 707/102 |
| 2004/0034666 A1* | 2/2004 | Chen .......................... 707/104.1 |
| 2004/0117358 A1* | 6/2004 | von Kaenel et al. .............. 707/3 |
| 2005/0281248 A1* | 12/2005 | Aoki et al. ..................... 370/351 |

OTHER PUBLICATIONS

Randal C. Burns et al., An Analytical Study of Opportunistic Lease Renewal, 2001, IEEE, 146-153.*

* cited by examiner

*Primary Examiner* — Jean B Fleurantin
(74) *Attorney, Agent, or Firm* — Brian Klawinski (57) ABSTRACT

A improved tract-based lease data management systems is described that allow for rendering maps of database entities with reduced data entry. The invention includes methods for linking, unlinking, detecting invalidating changes, and rebuilding database entity geographical representations.

8 Claims, 7 Drawing Sheets

METHOD AND PROGRAM PRODUCT FOR GIS ENABLED LAND MANAGEMENT SYSTEM

BACKGROUND OF THE INVENTION

1. Field of the Invention

The present invention relates generally to the field of computerized lease data management systems, and particularly to enhancing tract-based lease data management systems with geographic data.

2. Description of the Related Art

The advent of computer databases has allowed industries to store large amounts of data and have that data readily available for reporting and analysis. The design and content of a database primarily depends on the type of data and industry the database will be utilized. Even within the same industry there can be tradeoffs between different design implementations that allow for easier data entry or better reporting capabilities.

In the field of lease data management there are primarily two types of database design. One is lease based and the other is tract based. Lease based systems have simplified data entry, but are less capable in reporting. Tract based systems require more time and knowledge for data entry, but are able to produce reports easier.

Lease data management systems track information that pertains to areas on Earth. The information maintained includes things such as ownership and expiration of leases. Reports on this information, such as expiration reports, are better understood visually. To perform this task currently, systems require a draftsperson draw each lease and then gather the information from the database for visualization. Drafting each element from the lease data management system is time consuming and requires specialized knowledge. Therefore, there exists a need for a new and improved lease data management system that includes spatial capability.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, the invention is described as using geometry or geography columns in a client-server database, however, any column type may be used that is capable of storing data that can be interpreted as spatial data.

In one or more embodiments as described herein, a method and program product for enhancing tract-based lease data management systems (LDMS) with geographic data is provided, wherein users of the LDMS link a spatial feature to a LDMS entity and the LDMS entity automatically updates and rebuilds all dependent entities. In this way, the complexity of the LDMS is minimized and enables visual reports and maps to be generated.

The present invention applies in particular to LDMSs that are tract-based. In a tract-based LDMS, the system stores information on entities such as tracts, leases, prospects, units, wells, and properties. These various types of information are referred to as entity types. The tract-based LDMS is different than a lease-based LDMS because data entry focuses on the tract. Further, in a tract-based system a tract is only entered once and used by multiple leases. In a lease-based LDMS, data entry focuses on the lease level and a tract may have to be re-entered for each lease.

In addition to having different types of entities, there are also hierarchical relationships between those entities. An entity may be described as a parent or child entity relative to another entity. A child entity is an entity that forms a part of a parent entity. There may be any number of levels of child entities or parent entities. For example, a prospect entity is a parent entity to lease and tract entities. A lease entity is a parent entity to the tract entity and a child entity to the prospect. The entity hierarchy is shown in conjunction with the description of FIG. 3.

A tract represents a piece of land, typically with a specific set of ownership rights. Those skilled in the art will readily acknowledge that some LDMSs will further represent a tract as composed of an entity called a subtract. However, this distinction is unimportant with the explanation of the present invention. Throughout this application, the term tract shall refer to the lowest level description of land in the LDMS.

A lease is comprised of one or more tracts of land. A lease includes information such as the grantor, grantee, expiration, and other terms of the lease. Leases may included any number of cross-reference information without departing from the spirit of the present invention.

A prospect represents an area covered by a group of leases covering a specified area. For example, a company may determine a portion of a county should be leased for minerals. Typically a lease will be a part of a single prospect. For the purposes of discussion of the present invention, a prospect entity is considered the highest level of database entity. It will be acknowledged to those skilled in the art that there may be any number of database entities added to the LDMS hierarchy without departing from the spirit and scope of the present invention.

Other entities such as units, wells, and properties are related in various ways to the tract, lease, and prospect entities. The nature of the relationship of these entities may vary from system to system; however, these variations do not limit the usefulness of the present invention. Those skilled in the art will readily notice the application of the present invention to any variation of entities.

A spatial feature is a geometric shape that represents a defined area of the world. Spatial features may be point, lines, or polygons. In an LDMS, a spatial feature is typically a polygon that represents the area of the world covered by a database entity. For example, a tract spatial feature will represent the parcel bounds that are covered by the given tract.

The present invention shall be discussed by way of example of the tract, lease, and prospect entities in a LDMS. Those skilled in the art will readily acknowledge the techniques and methods described with those entities may be applied to other types of entities.

The present invention comprises of four core functions. First, linking a spatial feature to a tract entity. Second, unlinking a spatial feature from a tract entity. Third, determining when a spatial feature related to an entity is invalid and needs to be rebuilt. Fourth, building a spatial feature for a database entity. Each of these core functions will be discussed below in the context of a preferred embodiment of the present invention.

Figure 1:
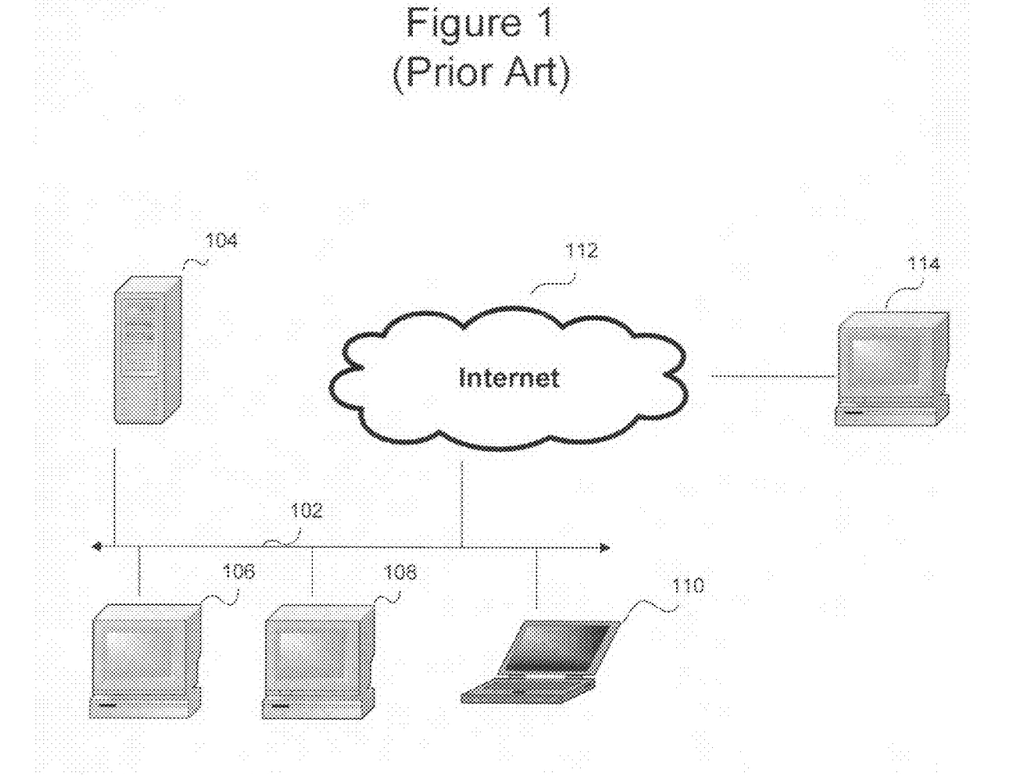
FIG. 1 is a block diagram of client-server environment of one embodiment of the present invention.

With reference now to the figures, and in particular with reference to FIG. 1, there is shown a block diagram of a client-server environment for one embodiment of the present invention. Local Area Network (LAN) 102 connects Server 104 with Workstation 106, Workstation 108, and Laptop 110. LAN 102 also includes a connection to Internet 102. Remote workstation 114 is connected to Internet 112.

Server 104 comprises an operating system, applications and necessary hardware such as hard drives, processors, and physical memory for operation. Among the applications on Server 104 is a client-server database application, such as Oracle or Microsoft SQL Server. The client-server database comprises storage for information and database logic. Further, the client-server database application allows clients to connect to the database, either directly or indirectly, to query, add, update, or delete information.

In a preferred embodiment of the present invention, the client-server database on Server 104 comprises a tract-based lease data management system (LDMS). The LDMS comprises tables for relating and storing information on tract, lease, and prospect entities as shown in conjunction with FIG. 3. Application business logic is also present on Server 104 for the operation of the LDMS. In an alternative embodiment, the application business logic is present on Workstation 106 or a combination of Server 104 and Workstation 106.

Workstations 106 comprises user interface logic for allowing a workstation operator to interact with the LDMS. The user interface logic includes computer program instructions for displaying information on Workstation 106 and allowing the workstation operator to issue commands to the application business logic. A web browser or custom application serve as examples of user interface logic.

Workstation 114 connects to Server 104 via Internet 112. While not depicted, those skilled in the art will recognize that Workstation 114 may connect to Server 104 through any number of methods, such as a through a Virtual Private Network (VPN), Router/Firewall, or remote login.

Internet 112 represents what is commonly known as the World Wide Web that comprises a global network of computers.

Those skilled in the art will readily appreciate that while shown as two distinct machines, the client and server may reside within the same physical computer without departing from the scope and spirit of the present invention. Further, in alternative embodiments the server role may be comprised of multiple computers that are part of a server farm.

Figure 2:
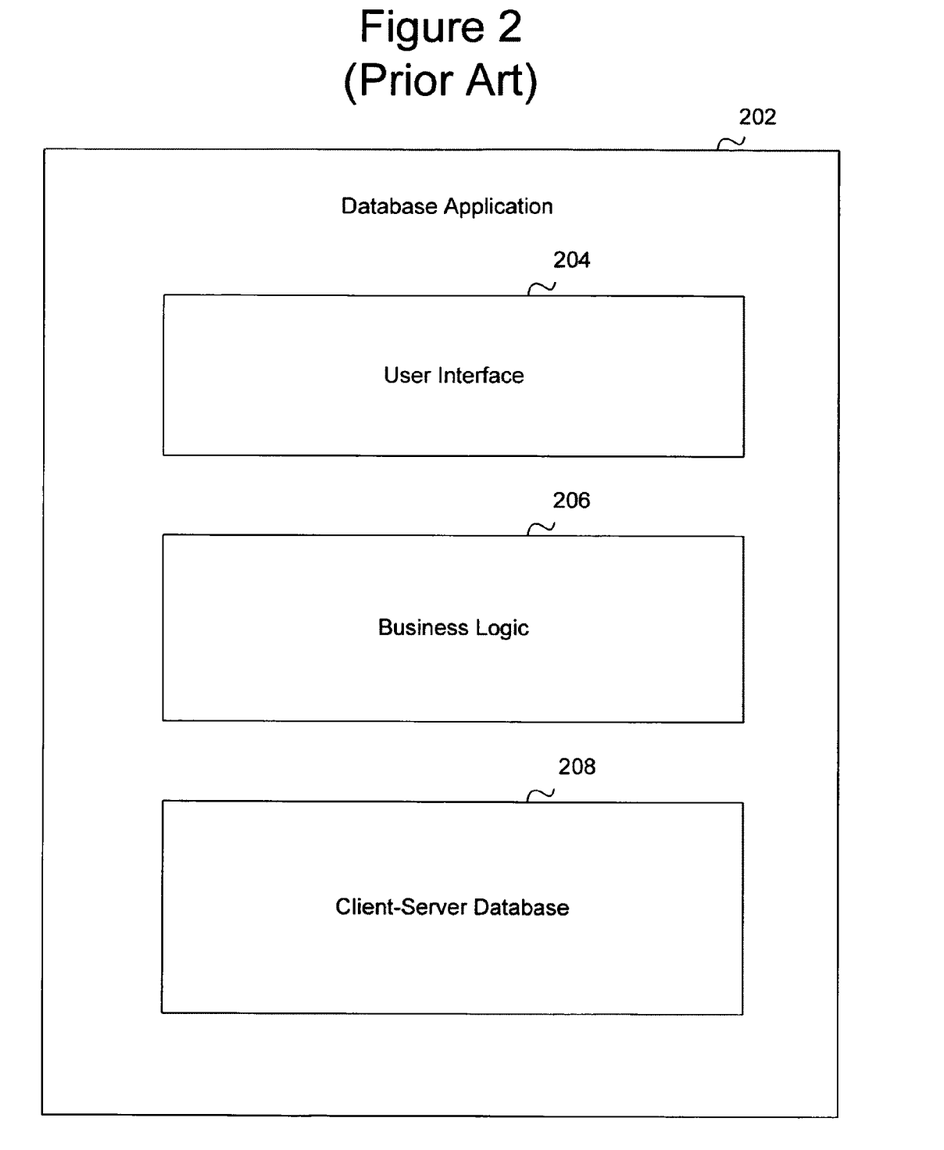
FIG. 2 is block diagram of the logic components of prior art lease data management systems.

With referenced now to FIG. 2, a block diagram of the logic components of prior art lease data management systems (LDMS) is shown. Database Application 202 is an LDMS designed with what is commonly known as a multitier, n-tier, and three-tier application design.

User Interface 204 comprises the top-most level of the application. Its main function is to translate tasks and results into a form the user can understand and interact with. User Interface 204 includes forms for the user to enter query information and to complete data entry for tasks of the LDMS. In a preferred embodiment, User Interface 204 resides on WorkStation 106.

Business Logic 206 coordinates the application, processes commands, makes logical decisions and evaluations. Business Logic 206 moves and processes data between User Interface 204 and Client-Server Database 208. In a preferred embodiment, Business Logic 206 resides on Server 104.

Client-Server Database 208 stores and retrieves information from a database or file-system. Information is passed to Business Logic 206 and then to User Interface 204. In a preferred embodiment, Client-Server Database 208 resides on Server 104.

In alternative embodiments, the LDMS is implemented in a Model View Controller (MVC) architecture (not depicted). A person of ordinary skill in the art will appreciate that the software architecture chosen to implement the LDMS may vary without departing from the scope and spirit of the present invention.

Figure 3:
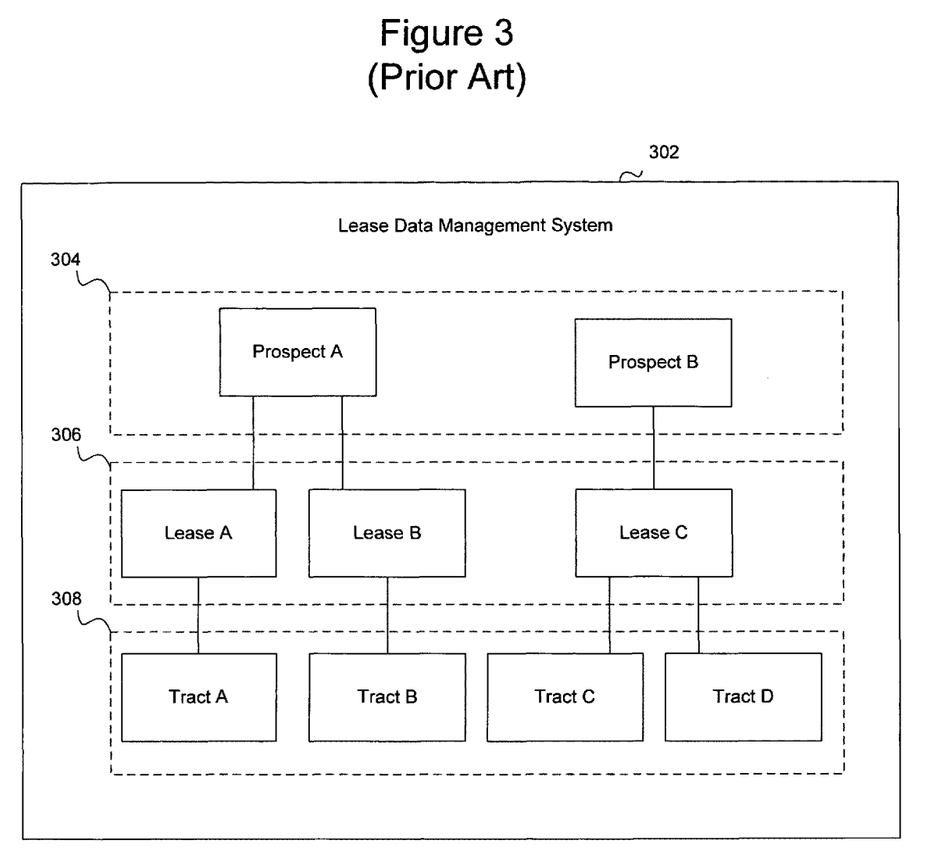
FIG. 3 shows a block diagram of the database entities for a prior art lease data management system.

With referenced now to FIG. 3, a block diagram of the database entities for a prior art lease data management system is shown. Lease Data Management System (LDMS) 302 represents the data storage of Client-Server Database 208.

LDMS 302 comprises of three database entity types: Prospects 304, Leases 306, and Tracts 308. Each of the database entities are associated with one another through a hierarchical relationship. In a preferred embodiment, Prospects 304, Leases 306, and Tracts 308 exist as tables in Client-Server Database 208. The table for each entity type includes the information that is customarily associated with each entity type and information for cross referencing the entities to other database entities not depicted in FIG. 3.

Prospects 304 comprises a set prospect entities. Prospects are comprised of one or more leases. As shown in FIG. 3, Prospect A comprises of Lease A and Lease B. Prospect A is the parent entity to Lease A and Lease B. Lease A is a child entity of Prospect A.

Leases 306 comprises a set of lease entities. Leases are comprised of one or more tracts. FIG. 3 depicts Lease B comprising of Tract B. Lease B is the parent entity to Tract B. Tract B is a child entity to Lease B.

Tracts 308 comprises a set of tract entities. Tracts are the lowest level database entity that may be visualized on a map. In some LDMSs, a tract may be decomposed into a subtract. The present invention is equally application to such systems. Additionally, while not depicted, it is possible in some LDMSs for a tract to belong to multiple leases. In those cases, the present invention is equally applicable.

Figure 4:
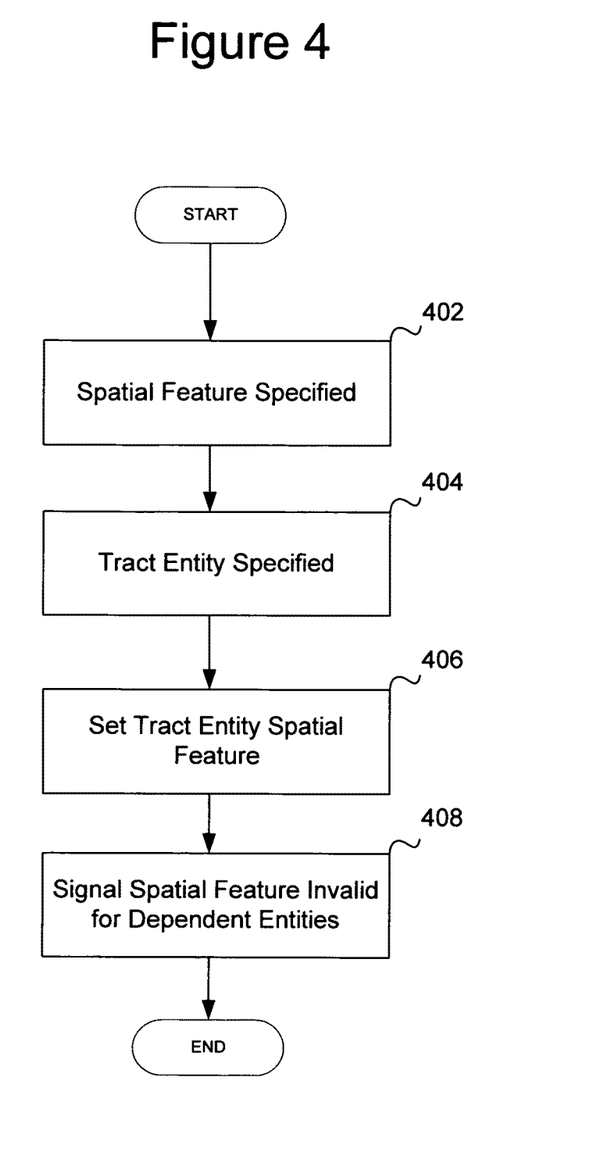
FIG. 4 illustrates a flow chart for a preferred embodiment of a linking process of the present invention in which a spatial feature is associated with a database entity.

With referenced now to FIG. 4, a flow chart for a preferred embodiment of an linking process of the present invention in which a spatial feature is associated with a database entity is illustrated.

The process begins at Step 402 where a spatial feature is specified. The spatial feature includes the bounding area for the tract entity specified in Step 404. In a preferred embodiment, the spatial feature is specified through a user interface by selecting a spatial feature on a map display.

At Step 404, a tract entity is specified to be linked with the spatial feature selected from Step 402. In a preferred embodiment, the tract entity is a row in a table in Client-Server Database 208 that stores tract information. The tract entity is selected from a list of currently linked tracts.

In a preferred embodiment, Step 402 and Step 404 are implemented in application code added to User Interface 204.

Following the specification of a tract entity and a spatial feature, the process moves to Step 406 where the spatial feature is set for the selected tract entity. In a preferred embodiment, the spatial feature is stored as an added geography or geometry column in Tracts 308. In an alternative embodiment, a separate table is used to store the spatial feature and a unique identifier. The unique identifier is then stored along with the data in Tracts 308. In a preferred embodiment, the application code for carrying out the functions of Step 406 are added to Business Logic 206.

Once the spatial feature is set for the specified tract, application logic is signaled to invalidate the spatial features for dependent database entities, such as tracts and prospects that are comprised of the specified tract.

In a preferred embodiment, the application logic is signaled through a database trigger upon or after the committing of the selected spatial feature to the client-server database. The invalidation signal causes the rebuild process of FIG. 6 to take place. The means for sending the invalidation signal include: direct process call, message queue, web service call, or database broker service.

Those skilled in the art will easily recognize that the Step 402 and Step 404 may be reversed without departing from the scope and spirit of the present invention.

Figure 5:
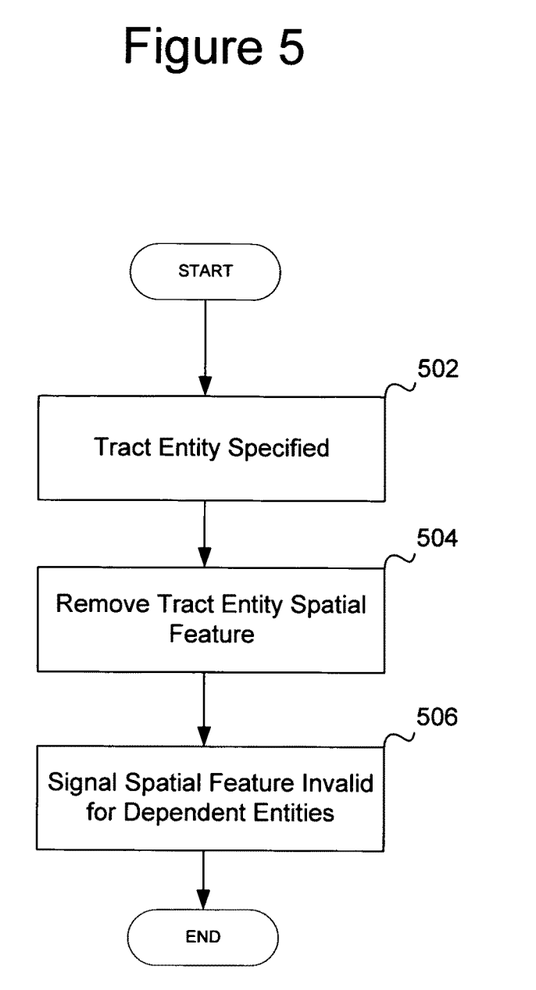
FIG. 5 depicts a flow chart for an unlinking process where a spatial feature is disassociated from a database entity, in accordance with a preferred embodiment of the present invention.

With referenced now to FIG. 5, a flow chart for an unlinking process where a spatial feature is disassociated from a database entity is depicted, in accordance with a preferred embodiment of the present invention. The unlinking process disassociates a spatial feature from a tract entity.

The unlinking process begins at Step 502 where a tract entity is specified to be unlinked. In a preferred embodiment, the tract entity is specified from a list of tracts. In other embodiments, the tract is specified directly by viewing the tract entity in the database and requesting it to be unlinked.

Once a tract entity is specified, the process moves to Step 504 where the spatial feature associated with the specified tract entity is removed. In a preferred embodiment where the spatial feature is stored in the same table as the tract entity, the spatial feature is set to NULL. In alternative embodiments, where the spatial feature is linked via a unique identifier, the unique identifier stored with the tract entity is set to a value, such as 0 or NULL, that indicates the tract is not linked.

Once the spatial feature is unlinked for the specified tract, application logic is signaled to invalidate the spatial features for dependent database entities, such as leases and prospects that are comprised of the specified tract.

In a preferred embodiment, the application logic is signaled through a database trigger upon or after the committing of the selected spatial feature to the client-server database. The invalidation signal causes, directly or indirectly, the rebuild process of FIG. 6 to take place. The means for sending the invalidation signal include: direct process call, message queue, web service call, or database broker service.

Figure 6:
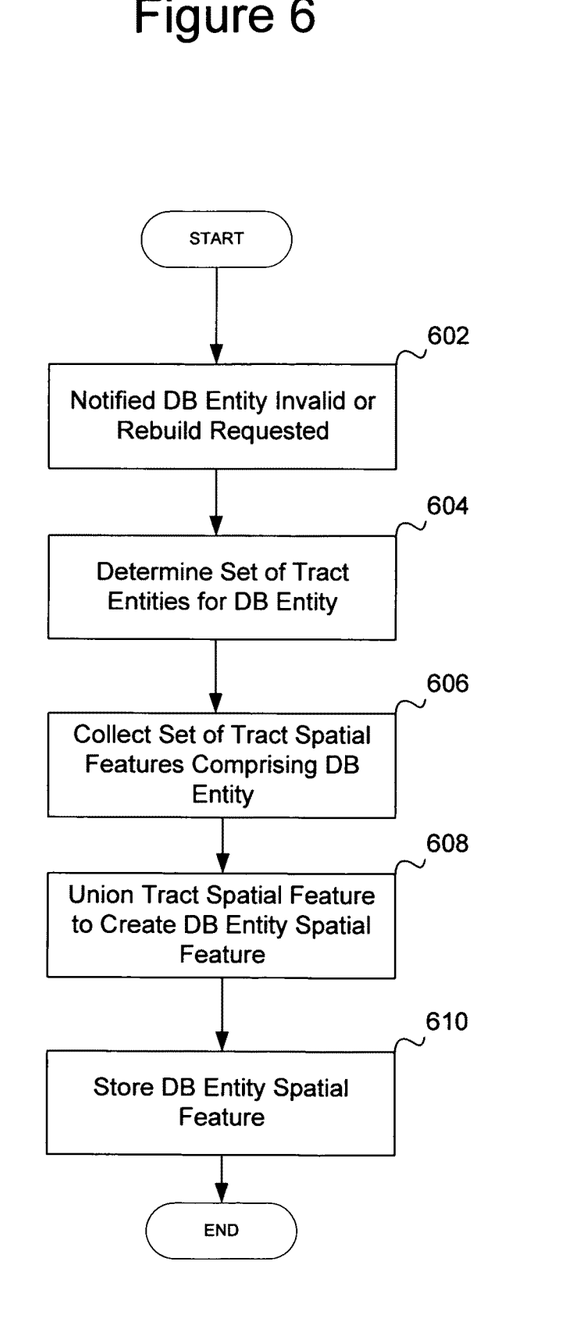
FIG. 6 shows a flow chart for a process of rebuilding spatial features in response to a change to a database entity, in accordance with a preferred embodiment of the present invention.

With referenced now to FIG. 6, a flow chart for a process of rebuilding spatial features in response to a change to a database entity is shown, in accordance with a preferred embodiment of the present invention. The process of FIG. 6 is implemented as a service process residing on Server 104 that listens for messages from Client-Server Database 208. The advantage of implementing the rebuilding of spatial features in a separate service process is that the LDMS suffers no performance penalty when making changes that invalidate an entity spatial feature. If implemented in the same thread as the database calls, the LDMS may have to wait for the spatial features to be updated to be rebuilt.

In an alternative embodiment, the process of FIG. 6 is implemented in the same thread as other database calls. As server technology increases, the potential performance penalty in rebuilding spatial features will become unnoticeable.

The rebuild process begins at Step 602 upon a notification or signal that a database entity has changed or a rebuild request was received. An invalidation signal is presented for a database entity as a result of a change to a dependent tract spatial feature or a database entity being removed or added that is a child entity of the database entity. A rebuild request is received as a result of a user requesting a rebuild or a database maintenance service. The means for sending the rebuild request include: direct process call, message queue, web service call, or database broker service.

After the rebuild notification is received at Step 602, the process moves to Step 604. At Step 604, the application logic determines a set of tract entities that are children of the specified database entity. In a preferred embodiment, the set of tract entities is determined by querying the client-server database. The query issued depends on the type of specified database entity. For example, for a prospect entity, the query will perform a select statement that joins the prospect, lease, and tract tables and selects only tracts that are children of the prospect.

Once a set of tract entities is determined for the specified database entity, the process moves to Step 606. At Step 606, the application logic collects a set of spatial features for each of the tract entities. In some cases, a tract entity will not have a spatial feature, in those cases, the tract is ignored. In a preferred embodiment, the spatial features for the tracts is returned concurrently with the query performed in Step 604.

At Step 608, the set of spatial features determined at Step 606 are unioned together into a single spatial feature. The union process takes a set of spatial features and combines them into a single feature that does not include interior lines for areas that are touching. It should be noted that unioning two non-touching spatial features results in a multipart feature that comprises each of the non-touching parts. In a preferred embodiment, the union computation includes a delta factor for determining how close two spatial features must be to consider them as touching. Including the delta factor allows for the use of less accurate spatial features to represent tracts. The resulting spatial feature is the database entity spatial feature.

Following construction of the database entity spatial feature at Step 608, the process advances to Step 610. At Step 610 the database entity spatial feature is stored in the client-server database. In a preferred embodiment, the database entity spatial feature is stored along with the database entity it represents in a geography or geometry column.

Figure 7:
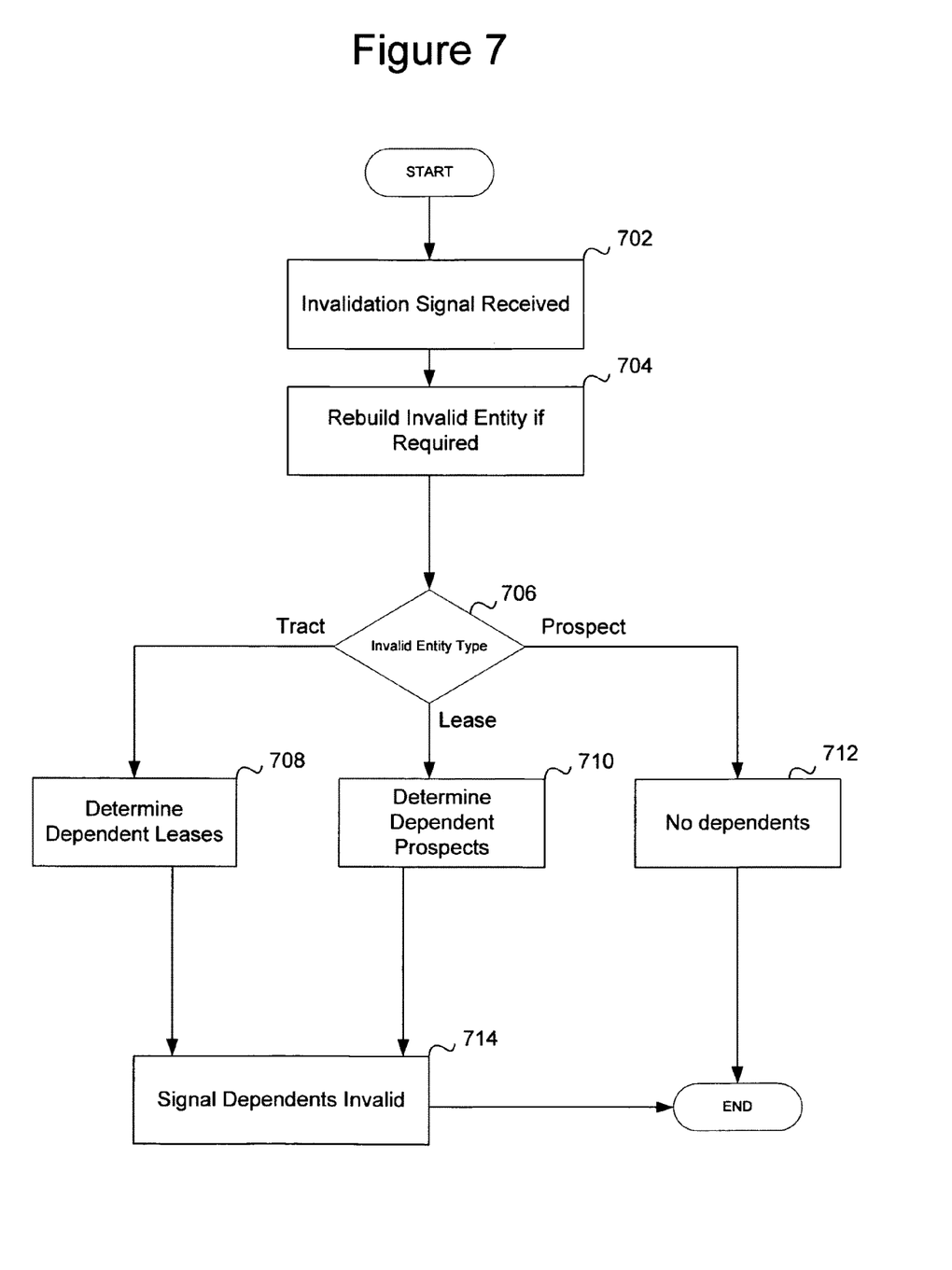
FIG. 7 illustrates a flow chart for a process of handling an invalidation signal for a database entity, in accordance with a preferred embodiment of the present invention.

With referenced now to FIG. 7, a flow chart for a process of handling an invalidation signal for a database entity is illustrated, in accordance with a preferred embodiment of the present invention. In the present invention, an invalidation signal results from a hierarchical change or a spatial feature change. In a preferred embodiment, the invalidation signal includes information on a database entity, including an identifier, type of entity, and if the invalid entity requires rebuilding.

The process beings at Step 702 when the invalidation signal and relevant information is received. In an alternative embodiment, the invalidation signal only includes the invalid entity.

After the invalidation signal is received, the process moves to Step 704. At Step 704, the spatial feature for the invalid database entity is rebuilt if required in accordance with the process set forth in conjunction with FIG. 6. In a preferred embodiment, a tract feature does not require rebuilding since the spatial feature is set during the linking and unlinking process set forth in conjunction with FIGS. 4 and 5, respectively.

Following Step 704 the process moves to a decision block at Step 706 to determine the type of invalid entity. The type of invalid entity determines what further steps are required to rebuild invalid database entities in the system as a result of the invalidation signal received at Step 702.

If the invalid entity is a tract entity, the process advances to Step 708. At Step 708, the application logic determines the set of dependent leases in the LDMS that include the invalid tract. Similarly, if the invalid entity is a lease entity, the process advances to Step 710. At Step 710, the application logic determines the set of dependent prospects in the LDMS that include the invalid lease.

If the invalid entity is a prospect, the process advances to Step 712 that indicates no dependents exist in the LDMS. The process then terminates.

In the case of an invalid tract or lease, the process will advance from Step 708 or Step 710, respectively, to Step 714. At Step 714, the application logic signals that the dependent database entities, if any, either lease or prospects, are invalid. In a preferred embodiment, the process for handling the current invalidation signal ends. However, in response any of the invalidation signals generated at Step 714, the process starts over.

The process of FIG. 7 is implemented as a service process residing on Server 104 that listens for messages from Client-Server Database 208. The advantage of implementing the rebuilding of spatial features in a separate service process is that the LDMS suffers no performance penalty when making changes that invalidate an entity spatial feature. If implemented in the same thread as the database calls, the LDMS may have to wait for the spatial features to be updated to be rebuilt.

In an alternative embodiment, the process of FIG. 7 is implemented in the same thread as other database calls. As server technology increases, the potential performance penalty in rebuilding spatial features will become unnoticeable.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A lease data management computer system comprising:
   a client-server database, said client-server database comprising storage for a tract-base lease data management system, using a processor, said data management system comprising a set of tract entities;
   a storage repository for spatial features;
   logic instructions for linking a spatial feature to a tract entity and logic instructions for building a lease spatial feature for a lease entity,
   wherein logic instructions for building the lease spatial feature for the database entity comprises:
   instructions for determining a subset of tract entities associated with the lease entity;
   instructions for determining a set of tract spatial features representing the subset of tract entities; and
   instructions for combining the set of tract spatial features to build the lease spatial feature;
   logic instructions for detecting if a spatial feature for a database entity is invalid;
   wherein logic instructions for linking the spatial feature to the tract entity comprises: instructions for adding the spatial feature to a table not containing the tract entity and assigning the spatial feature a spatial feature id; and
   instructions for adding the spatial feature id to a table containing the tract entity.

2. The lease data management computer system of claim 1, wherein the data management system further comprises prospect entities.

3. The lease data management computer system of claim 1, further comprising:
   logic instructions for unlinking a spatial feature from a tract entity.

4. The lease data management computer system of claim 1, further comprising:
   logic instructions, in response to detecting if the spatial feature for a database entity is invalid, for building a valid spatial feature for the database entity.

5. The lease data management computer system of claim 1, wherein the storage repository for the spatial features comprises a spatial column in said client-server database.

6. The lease data management computer system of claim 1, wherein logic instructions for linking the spatial feature to the tract entity comprises:
   instructions for adding the spatial feature to a table containing the tract entity.

7. The lease data management computer system of claim 1, wherein the client-server database is Oracle.

8. A method for spatially enabling a tract-based lease data management system utilizing a client-server database, using a processor, said method comprising:
- steps for linking a spatial feature to a tract entity in the tract-based lease data management system;
- steps for building a lease spatial feature for a lease entity, wherein the steps for building the lease spatial feature for the database entity comprises:
  - steps for determining a subset of tract entities associated with the lease entity;
  - steps for determining a set of tract spatial features representing the subset of tract entities; and
  - steps for combining the set of tract spatial features to build the lease spatial feature;
  - steps for combining the set of tract spatial features to build the lease spatial feature;
  - steps for detecting if a spatial feature for a database entity is invalid;
- wherein logic instructions for linking the spatial feature to the tract entity comprises:
  - steps for adding the spatial feature to a table not containing the tract entity and assigning the spatial feature a spatial feature id; and
  - steps for adding the spatial feature id to a table containing the tract entity.

* * * * *